United States Patent
Spuller

(10) Patent No.: US 11,780,132 B2
(45) Date of Patent: Oct. 10, 2023

(54) INJECTION MOLDING DEVICE

(71) Applicant: OTTO MÄNNER GMBH, Bahlingen a.K. (DE)

(72) Inventor: Swen Spuller, Forchheim (DE)

(73) Assignee: OTTO MÄNNER GMBH, Bahlingen a.K (DE)

( * ) Notice: Subject to any disclaimer, the term of this patent is extended or adjusted under 35 U.S.C. 154(b) by 493 days.

(21) Appl. No.: 16/619,349

(22) PCT Filed: Jul. 14, 2017

(86) PCT No.: PCT/EP2017/067933
§ 371 (c)(1),
(2) Date: Dec. 4, 2019

(87) PCT Pub. No.: WO2019/011450
PCT Pub. Date: Jan. 17, 2019

(65) Prior Publication Data
US 2020/0114553 A1    Apr. 16, 2020

(51) Int. Cl.
*B29C 45/28* (2006.01)
*B29C 45/22* (2006.01)
(Continued)

(52) U.S. Cl.
CPC ............ *B29C 45/22* (2013.01); *B29C 45/231* (2013.01); *B29C 45/2708* (2013.01); *B29C 2045/2761* (2013.01)

(58) Field of Classification Search
CPC ............ B29C 45/2806; B29C 45/2708; B29C 2045/2769; B29C 2045/2764; B29C 2045/2855
See application file for complete search history.

(56) References Cited

U.S. PATENT DOCUMENTS 6,162,044 A    12/2000   Babin
RE39,935 E  *  12/2007  Babin ................ B29C 45/2806
                                                425/562
(Continued)

FOREIGN PATENT DOCUMENTS

CN    1526538 A    9/2004
CN  101161444 A    4/2008
(Continued)

OTHER PUBLICATIONS

European Patent Office, English language version of a European Office Action for European Application No. 17742719.2 (EPO Forms 2001 and 2906), dated Feb. 17, 2021 (6pp.).
(Continued)

*Primary Examiner* — Thu-Khanh T. Nguyen
(74) *Attorney, Agent, or Firm* — Pauley Erickson & Swanson

(57) ABSTRACT

An injection molding device and related method includes a mold plate with at least one pocket having at least one discharge opening to discharge melted plastic from the pocket into at least one mold cavity interconnected to the pocket and a nozzle including a housing, which during operation is interconnected to the pocket. Per discharge opening a needle is arranged displaceable in an axial direction in the housing between a closed position and an open position. In the closed position the needle closes the thereto related discharge opening and is thereby preventing melted plastic from flowing from the pocket into the at least one mold cavity. In the open position, the needle releases the discharge opening such that melted plastic flows from the pocket into the at least one mold cavity. Furthermore, a melt channel is discharging into the pocket to supply melted plastic into the pocket.

22 Claims, 4 Drawing Sheets

(51) Int. Cl.
*B29C 45/23* (2006.01)
*B29C 45/27* (2006.01)

(56) References Cited

U.S. PATENT DOCUMENTS

| | | | |
|---|---|---|---|
| 7,618,253 B2* | 11/2009 | Ten | B29C 45/2725 425/572 |
| 8,047,836 B2* | 11/2011 | Schmidt | B29C 45/281 425/564 |

FOREIGN PATENT DOCUMENTS

| | | |
|---|---|---|
| DE | 37 33 363 A1 | 4/1989 |
| DE | 4 104 433 A1 | 9/1991 |
| DE | 102 55 938 A1 | 6/2003 |
| EP | 0 051 252 A2 | 5/1982 |
| EP | 2 428 345 A2 | 3/2012 |
| JP | H09 123227 A | 5/1997 |
| JP | 2 674-188 B2 | 11/1997 |
| JP | 2002-36310 A | 2/2002 |
| KR | 2002 0025173 A | 4/2002 |
| KR | 10-2011-0072080 A | 6/2011 |
| KR | 10-2012-0130835 A | 12/2012 |

OTHER PUBLICATIONS

EPO (Riswijk, NL), English language version of the International Search Report, Form PCT/ISA/210, for International Application PCT/EP2017/067933, dated Aug. 6, 2018 (5 pages).

Chinese Patent Office, Chinese Language Search Report from the Notification of Grant for CN Patent Application 201780092122X, dated Aug. 18, 2021 (2 pages).

Schnell, T., "Mehrfach-Düse fur Nadelverschluss," [Drawing] , 1998 Günther Heisskanalterchnik GmbH, Frankenberg, Germany (1 page).

* cited by examiner

INJECTION MOLDING DEVICE

BACKGROUND OF THE INVENTION

Field of the Invention

The present invention relates to an injection molding device.

Discussion of Related Art

Injection molding devices known from the prior art normally comprise one or several nozzles which during operation are interconnected to an injection mold. The at least one nozzle usually injects and distributes melted plastic into one or several mold cavities of the injection mold. Usually, the melt stream is controlled by means of at least one displaceable needle that interrupts the melt supply in a controlled manner.

Nowadays, injection molding devices are known which are designed for a tight cavity pitch with a low nozzle spacing. Hence, the distribution of the melt to the mold cavities as well as the integration of the closing mechanism under such space requirements is a substantial challenge.

JP2002036310, published by the Mitsubishi Materials Corporation on the 2 Feb. 2002, relates to a valve gate type mold device with a small interval between the gates. Therefore, two material paths communicating with two gates are formed in the body of one valve. Two valve pins are foreseen to open and to close the melt flow. In the body of the valve, the inlet of material is realized by a material path that is branched from the material inlet.

U.S. Pat. No. 6,162,044, published on the 19 Dec. 2000 by Mold Masters LTD, discloses a valve gated injection molding apparatus. The apparatus is having several valve pins that are extending through each heated nozzle and driven by a common actuating mechanism. A valve bushing is seated in the front end of each heated nozzle. A central melt bore in each heated nozzle splits in the valve bushing near the front end of the heated nozzle from where the melt flows around each of the valve pins to the gates.

The injection molding devices known from the prior art are often unnecessarily complex and thus require more space resulting in a greater distance between the mold cavities. In addition thermal compensation is a challenge.

One object of the invention is to provide a nozzle, respective an injection molding device, which allows a space saving, simple and reliable design.

SUMMARY OF THE INVENTION

The invention is directed to a special design of an injection molding device, namely a nozzle and a mold plate, as described hereinafter, which at least during operation are interacting with each other. The special design allows multi-gate arrangements in a very narrow and space saving manner. The arrangement of the nozzle comprising at least one needle and the thereto corresponding mold plate which directly forms part of or is interconnected to an injection mold, allows to injection mold very small parts and/or apply multiple gates to one cavity, wherein the gates are arranged very narrow together.

In a preferred variation, the invention relates to an injection molding device comprising a (first) mold plate as mentioned above. The mold plate comprises at least one pocket foreseen to receive during production liquefied (melted) plastic. The at least one pocket is normally having at least one discharge opening to discharge the melted plastic from said pocket into at least one mold cavity arranged between a first and a second mold plate and interconnected to said pocket through the discharge opening. The injection molding device comprises a melt channel to supply melted plastic into the at least one pocket.

In addition the injection molding device comprises at least one nozzle (normally one per pocket) having a housing, which during operation is interconnected directly or indirectly to the pocket. Depending on the design, the pocket can have a certain depth, such that the nozzle is during operation partly inserted into the pocket. Per discharge opening normally one needle is arranged displaceable in an axial direction in the housing of the nozzle. The needle may be displaced between a closed and an open position and is actuated by an actuator. If appropriate the actuator can be designed, such that the needle can be stopped at least in an intermediate position arranged between the closed and the open position. In the closed position the needle closes the thereto related discharge opening (gate) and is thereby preventing melted plastic from flowing from the pocket into the at least one mold cavity. In the open position the needle is in a position in which it releases the discharge opening such that melted plastic can flow from the pocket into the at least one mold cavity. Preferably external fluid pressure is applied to further support the flow of the material, e.g. through the melt channel. Since the melted plastic is supplied through the melt channel into the pocket independently of the needle arranged in the needle bore, the needle—compared to the prior art—only needs to displace a comparatively short distance in order to block the discharge opening and thus prevent the melt form entering the mold cavity. In mechanisms known form the prior art, a larger displacement is often needed. This is due to the fact, that the supply of the melt is often controlled in a way that the melt channel is reduced to the diameter of the needle at its end in direction of the mold cavity. Hence the needle must be fully retracted to overcome this area of reduced diameter such that this part of the channel is unblocked and can be used for the melt. A further advantage is that the needle can be designed with a comparatively large diameter, which allows injecting more material per time.

In a preferred variation a spacer is arranged between an outer surface of the housing of the nozzle and an outer surface of the mold plate, respectively the pocket. Depending on the field of application the spacer can be integrated into the nozzle and/or the mold plate. If appropriate it can have a multi-part design. In an assembled position the spacer sits in between the housing of the nozzle and the mold-plate preventing direct contact between the nozzle and the mold plate. The spacer can act as a thermal isolator and/or a fluid seal between the housing and the mold plate preventing escape of melted plastic. To prevent unwanted displacement the spacer can be supported in at least one direction (e.g. the axial direction) from a shoulder of the housing of the nozzle and/or the mold plate. Furthermore, the spacer may prevent thermal expansion of the (heated) nozzle in a radial direction such that the needles are displaced in respect to the (cooled) discharge openings in the mold plate. The spacer is preferably annular shaped. Good results can be achieved by using a material having a good balance between a reasonable high E-module and a good thermal isolation quality, such as e.g. titan or ceramic. Depending on the field of application, other materials may be appropriate.

In a variation, the spacer may partially be made from a deformable material and comprising a sealing lip. The sealing lip is preferably designed in a way that a first side is facing the pocket and a second side, opposite of the first side, is abutting against the mold-plate and forming a sealing surface. This set-up is advantageous, since it is self-sealing, such that a higher pressure in the pocket results in the sealing lip being pressed by the pressure more firmly against the mold plate and hence resulting in a higher sealing force.

In a preferred variation the at least one needle is arranged in a needle bore in the housing of the nozzle and coaxially with a thereto related discharge opening. The at least one needle can at least when closed extend between the housing and the related discharge opening over a certain length surrounded by melted plastic. If appropriate the needle can be thermally interconnected to a heating element for heating of the melted plastic surrounding it during operation. The needle is therefore preferably made from a material which has a good thermal conductivity.

For compensation reasons at least one needle can be arranged displaceable in a lateral direction. Depending on the design and size of the injection molding device a tip section (first tip section) of at least one needle, which is foreseen to interact with the discharge opening, has a slightly reduced diameter in respect to the discharge opening such that a small gap is formed even, when in closed position. This is advantageous for the compensation of thermal expansion. Depending on the plastic material to be operated, good results can be achieved when the gap has a size with respect to the diameter of 0.02 mm to 0.5 mm. Even though a gap remains, the discharge openings are closed due to residuals of the plastic that is at least party solidified due do the fact that the mold plate is cooled. Alternatively, a sealing may also be formed between the tapered second section and the tapered dimple of the discharge opening in order to close the discharge openings.

If more than one needle (respectively discharge opening) is present, the melt channel is preferably orientated centralized between the needles in the housing. The opening of the melt channel into the pocket is preferably arranged symmetrically with respect to the at least one discharge opening to guarantee even distribution of the material. In a preferred variation of the invention, the at least one melt channel is arranged at least partially in the housing of the nozzle opening into said pocket. The opening into the pocket may be designed in a way that the cross section of the melt channel is funnel-like enlarged towards the pocket.

In a preferred variation the pocket comprises per discharge opening a dimple in which the discharge opening is arranged. Preferably, the dimple is at least partially shaped conical. Furthermore, the housing may comprise per needle a bump which cooperates with the dimple of the thereto related discharge opening forming a controlled flow path for the material. The bump can at least partially be shaped conical in order to follow the shape of the respective dimple.

If more than one discharge opening is present, neighboring dimples may be spaced apart by a ridge. Advantageously, the melt channel opening in the pocket is arranged aligned with at least one ridge in the axial direction, such that the ridge supports distribution of the melted plastic between at least two discharge openings. Alternatively or in addition, opposite of the melt channel opening in the axial direction, a distribution point may located on the mold plate. Preferably the distribution point is placed on a ridge. Furthermore, stream troughs may direct the melt from the melt channel opening to the respective dimples, respectively to the discharge openings.

If appropriate, the nozzle may comprise at least one heating element to heat the housing. Preferably, the at least one heating element is arranged between the housing and a thermally isolating sheath surrounding said housing. Said heating element can be e.g. spiral-shaped. The mold plate is generally not heated and may comprise at least one cooling element.

In a preferred variation of the invention, at least two needles are actuated by a common actuator. The at least two needles may further be interconnected to the common actuator by an actuator plate.

A method according to the invention for injecting melted plastic into a cavity comprises the following steps: At first, melted plastic is supplied into the pocket formed between the housing of the nozzle and the mold plate via the melt channel ending in said pocket. Secondly, the at least one discharge opening is opened by axial displacement of the needle arranged in said discharge opening, as explained above. After opening the discharge opening through retraction of the needle in axial direction, melted plastic is injected from the pocket into a thereto interconnected cavity through the discharge opening. At last, the discharge opening is closed again by moving the needle in the opposite direction as before, thereby stopping the injection of melted plastic in the interconnected cavity. During operation, respectively during the needle displacement in the axial direction, the needle may additionally be displaced in a radial direction with respect to the discharge opening to compensate mismatch. If appropriate, the needle may further be displaced in a gap formed between the needle and the discharge opening and/or gap between the needle and the housing.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the claims.

The drawings are showing.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, reference numbers will be used to refer to like components or parts.

Figure 1:
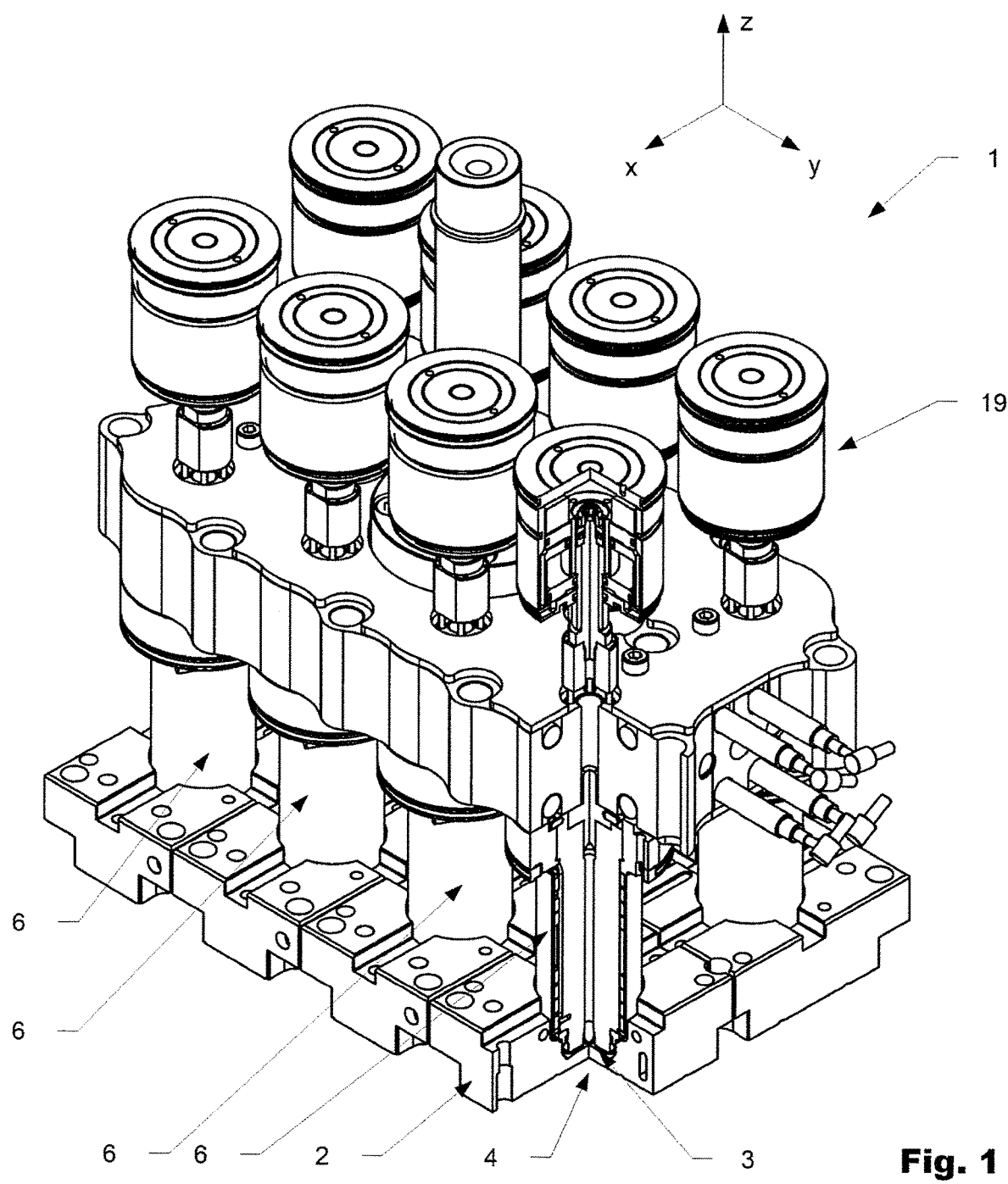
FIG. 1 is a first variation of an injection molding device according to invention in a perspective view, partly sectionized.

FIG. 1 shows a first variation of an injection molding device 1 according to invention in a perspective view and partly sectionized. The illustrated injection molding device 1 comprises multiple nozzles 6 interacting with one mold plate 2. Each nozzle 6 is interconnected to a pocket 3 of the mold plate 2 with at least one discharge opening 4 to discharge melt in a further mold cavity (not shown). Each nozzle 6 is further interconnected to an actuator 19, which actuates multiple needles of one nozzle through an actuator plate 20 to open and close the respective discharge openings 4 arranged in the pocket 3. In the shown variation, the injection molding device 1 features in total eight nozzles 6. However, according to the invention, the injection molding device 1 may also feature only one nozzle, one mold plate etc. Such a variation is illustrated in FIG. 2.

Figure 2:
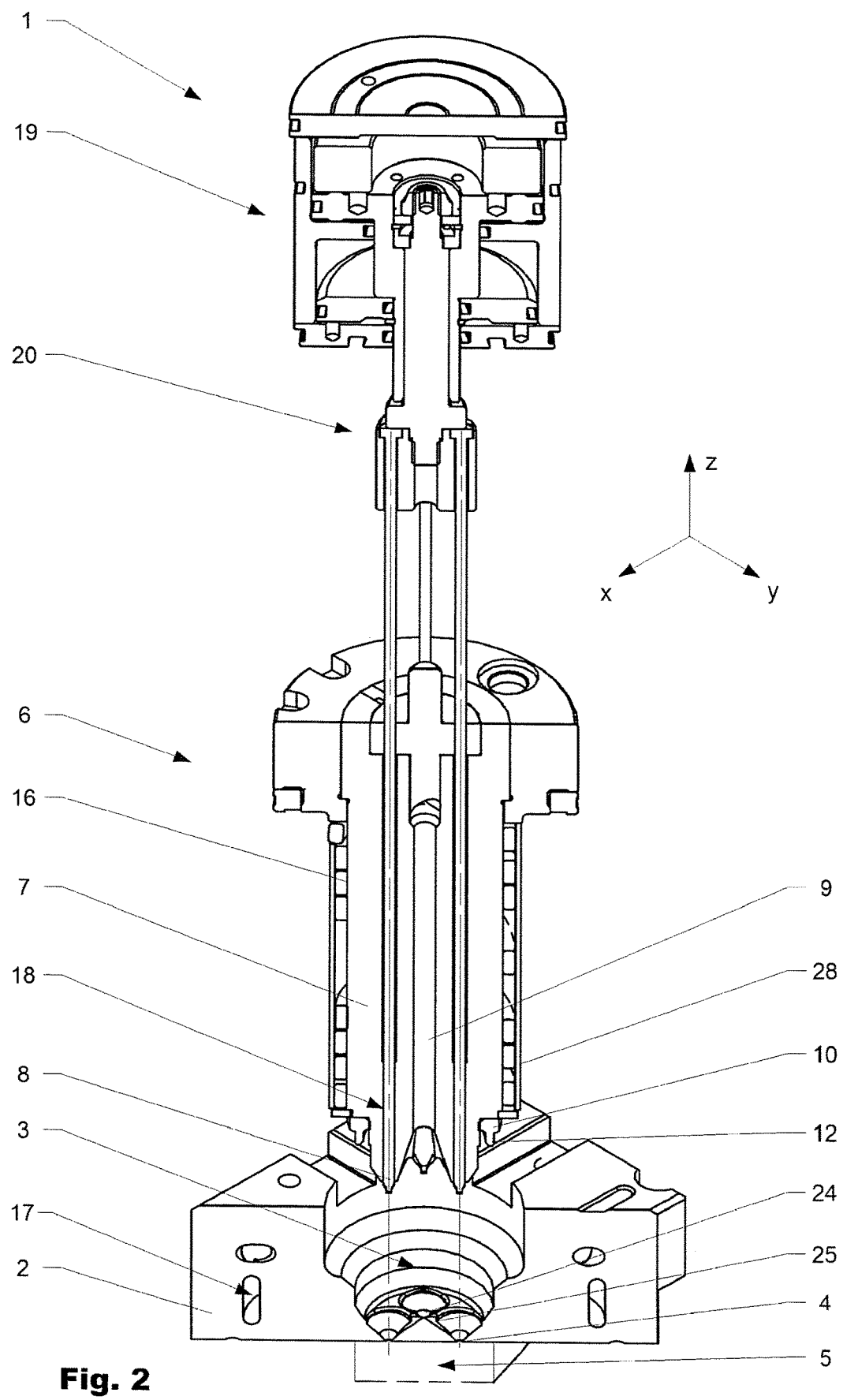
FIG. 2 is a second variation of an injection molding device in a disassembled state in a sectionized, perspective view.

FIG. 2 illustrates a second variation of the invention, where the injection molding device 1 comprises a mold plate 2 with a pocket 3 having multiple discharge openings 4 to discharge melted plastic from said pocket 3 into at least one mold cavity 5 (shown only schematically) interconnected to said pocket 3. The nozzle 6 comprises a housing 7, which during operation is interconnected to the pocket 3. In FIG. 2 the nozzle 5 and the mold plate 2 are shown in a separated manner, such that the inside becomes better apparent. Per discharge opening 4 a needle 8 is arranged displaceable in an axial direction (z-direction) in said housing 7 between an open and a closed position. The needles 8 are arranged in the housing 7 in corresponding needle bores 18 which are arranged coaxially with a thereto related discharge opening 4. Each discharge opening 4 is arranged at a lower end of a dimple 21 which in the shown variation is at least partially conically shaped such that a funnel towards the discharge opening 4 is formed. During operation the needles 8 extend between the housing 7 and the related discharge opening 4 over a free length at least in the closed position. In the open position they may be retracted in the housing 7 or remain extended over a reduced free length over said housing 7.

Figure 3:
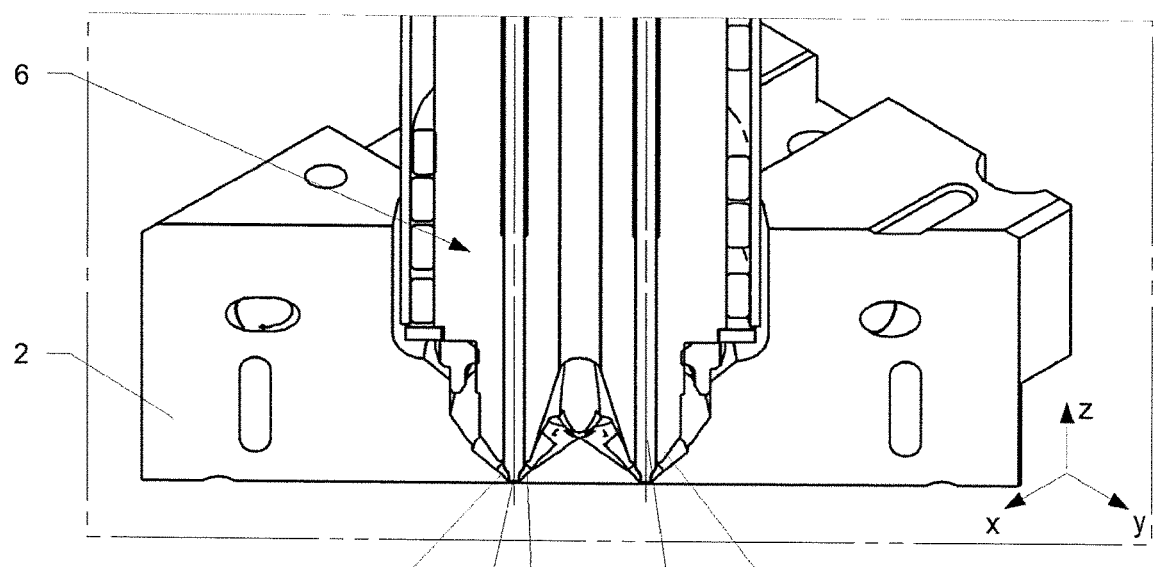
FIG. 3 is a detailed view of a closed position of the injection molding device according to FIG. 2 in a sectionized, perspective view.
Figure 4:
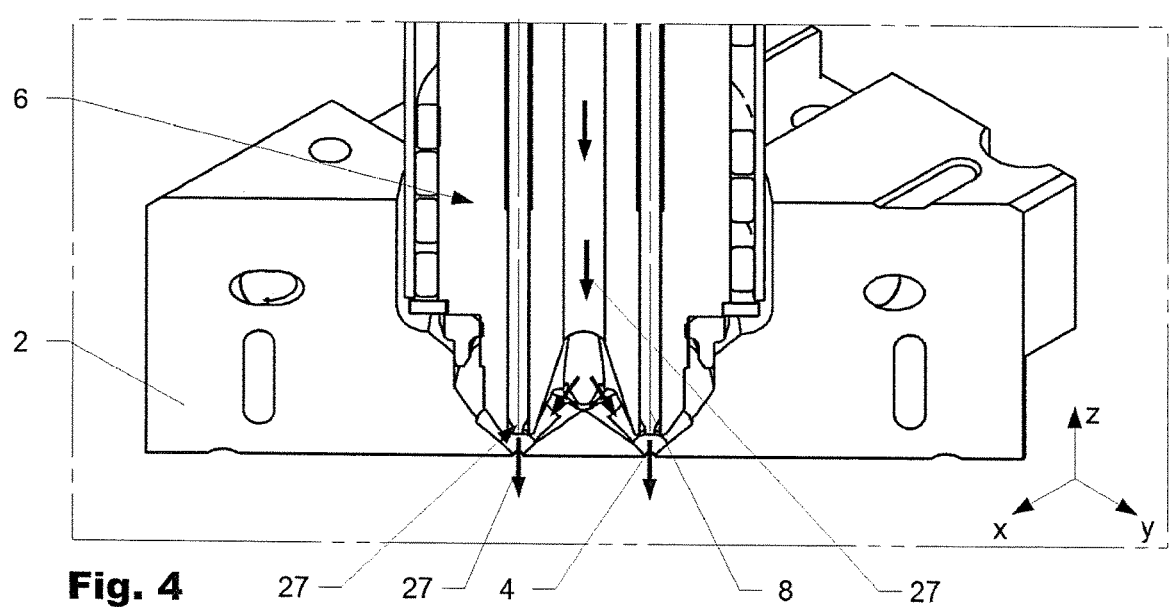
FIG. 4 is a detailed view of an open position of the injection molding device according to FIG. 2 in a sectionized, perspective view.

A detailed view of the injection molding device in the closed position is shown in FIG. 3, meanwhile the open position is shown in FIG. 4—both Figures are according to the variation of the invention of FIG. 2. In the closed position (FIG. 3) the multiple needles 8 close the thereto related discharge openings 4 thereby preventing melted plastic from flowing from the pocket 3 into the at least one mold cavity 5 (not shown here). In the open position as shown in FIG. 4 the needles 8 are displaced upwards (positive z-direction) by the actuator 19 and hence the needles 8 release the discharge openings 4 such that melted plastic can flow from the pocket 3 into the at least one mold cavity 5. As visible in FIG. 4, the melted plastic is supplied through a single melt channel 9, arranged at least partially in the housing 7. The melt channel 9 is discharging melt into the pocket 3, as illustrated by the arrows 27 indicating the direction of the melt flow. In the shown variation, the opening of the melt channel 9 into the pocket 3 is arranged symmetrically with respect to the discharge openings 4. The melt channel 9 is thus centralized between the multiple needles 8 such that the needles 8 are arranged around the melt channel 9 on a circle. To open, respectively to close the discharge openings 4 the needles are displaced in the axial direction (z) by means of the common actuator 19 (compare FIG. 2). Therefore, the needles 8 are each interconnected to an actuator plate 20 that is displaced by the actuator 19.

During closing of the discharge openings 4 with the needles 8, it is advantageous, that the needles 8 are displaceable in a lateral direction (x, y), perpendicular to the axial direction (z), such that the needles may be guided in the correct position to close the discharge opening 4. Preferably, a tip 28 of each needle comprises at its end (facing the pocket 3) a first tip section 29 with a reduced diameter, which is smaller than the diameter of the discharge opening 4. Preferably, the reduced diameter is about 0.05-0.5 mm smaller than the diameter of the discharge opening 4. Behind this first tip section 29 a second tip section 30 is arranged in which the diameter of the needle 8 is enlarged such that the second tip section 30 is tapered. Even through a gap remains between the first tip section 29 of the needles 8 and the discharge openings 4, the discharge openings 4 are closed due to residuals of the plastic that is at least party solidified due do the fact that the mold plate 2 is cooled. Alternatively, a sealing may also be formed between the tapered second section 30 and the tapered dimple 21 of the discharge opening 4 in order to close the discharge openings 4.

A spacer 10 is arranged between the housing 7 of the nozzle 6 and the mold plate 2, as it can be seen in the open and in the closed position. The spacer 10 seals the pocket 3 formed between the mold plate 2 and the nozzle 6 off with respect to the environment such that melted plastic supplied by the melt channel 9 into the pocket 3 can be discharged into the mold cavity 5 when the discharge openings 4 are opened by actuating the actuator 19.

Figure 5:
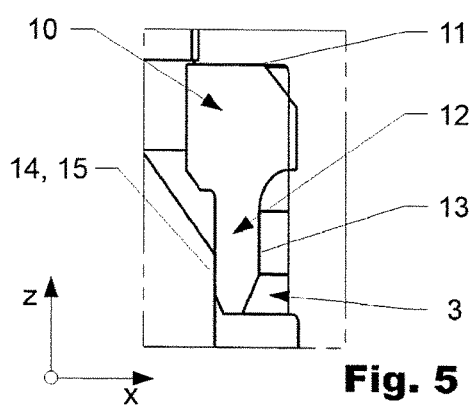
FIG. 5 is a detailed view on a spacer according to FIG. 2-4.

A detailed view of the spacer 10 is given in FIG. 5. The spacer 10 acts further as a thermal isolator between the heated nozzle 6 and the cooled mold plate 2. Preferably, the spacer is therefore made at least partly of a thermally isolating material. The nozzle is heated by means of a spiral shaped heating element 16, that is arranged around the housing 7 and between said housing 7 and a sheath 26. The cooling element 17 is placed in the mold plate 2, circumventing at least partially the pocket 3. The spacer 10 may act additionally as a seal between the housing 7 and the mold plate 2, sealing the part of the pocket 3 that is filled during operation with the melt. In the shown case, the housing 7 comprises a shoulder 11 which supports the spacer 10 in the axial direction (z). The spacer 10 comprises a sealing lip 12 which is extending in the axial direction (z). The sealing lip 12 has a first side 13 facing the pocket 3 filled with melt and a second side 14, opposite of the first side 13, abutting against the mold plate 2 and forming a sealing surface 15.

Figure 6:
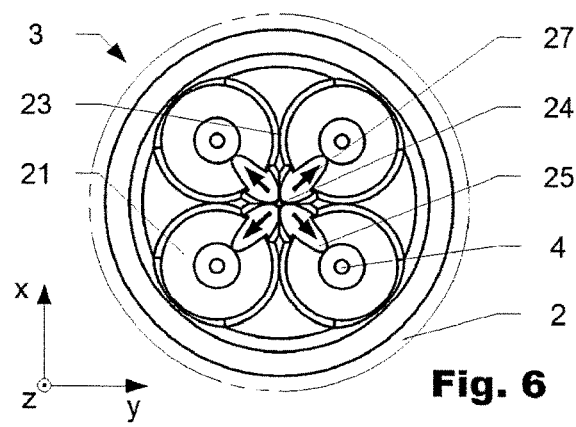
FIG. 6 is a top view from an axial direction in a pocket of to the injection molding device according to FIG. 2-4.

FIG. 6 depicts a view from the top inside a pocket 3 of to the injection molding device according to FIG. 2-FIG. 4. From this perspective, it can be seen that in the center of the pocket 3 on the mold plate 2 a distribution point 24 is placed. The distribution point 24 is opposite of the opening of the melt channel 9 into the pocket 3 in the axial direction (not shown). From said distribution point, multiple stream troughs 25 guide the liquid melt in elongated depressions in the surface of the mold plate towards a dimple 21 in which each a discharge opening 4 is arranged. Two neighboring dimples 21 are spaced apart by a ridge 23. The dimples 21 are designed in such a way, that corresponding bumps 22 of the housing 7 of the nozzle follow the outline of said dimple, however leaving space between the two in order to allow the melt to flow towards the discharge opening 4, as indicated by the arrows 27.

Figure 7:
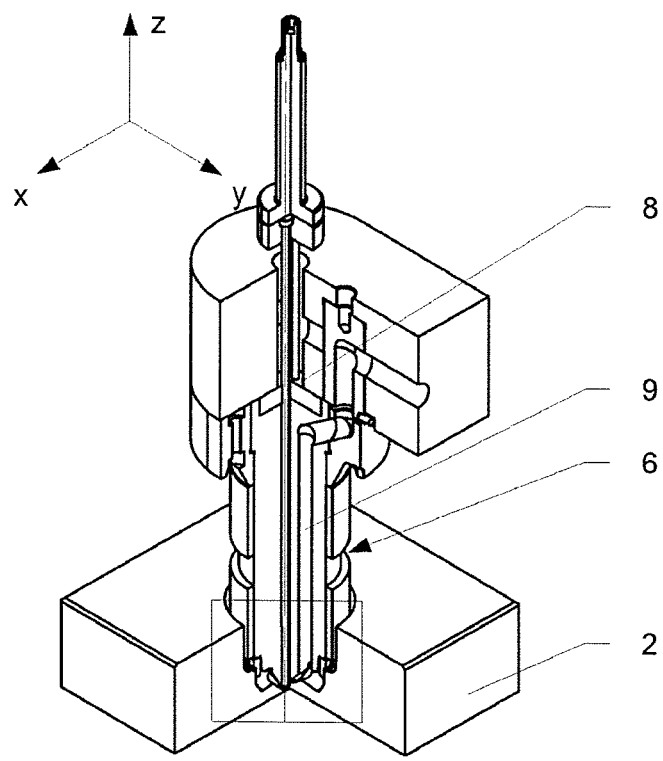
FIG. 7 is a further variation of the injection molding device according to invention in a perspective view, partly sectionized.
Figure 8:
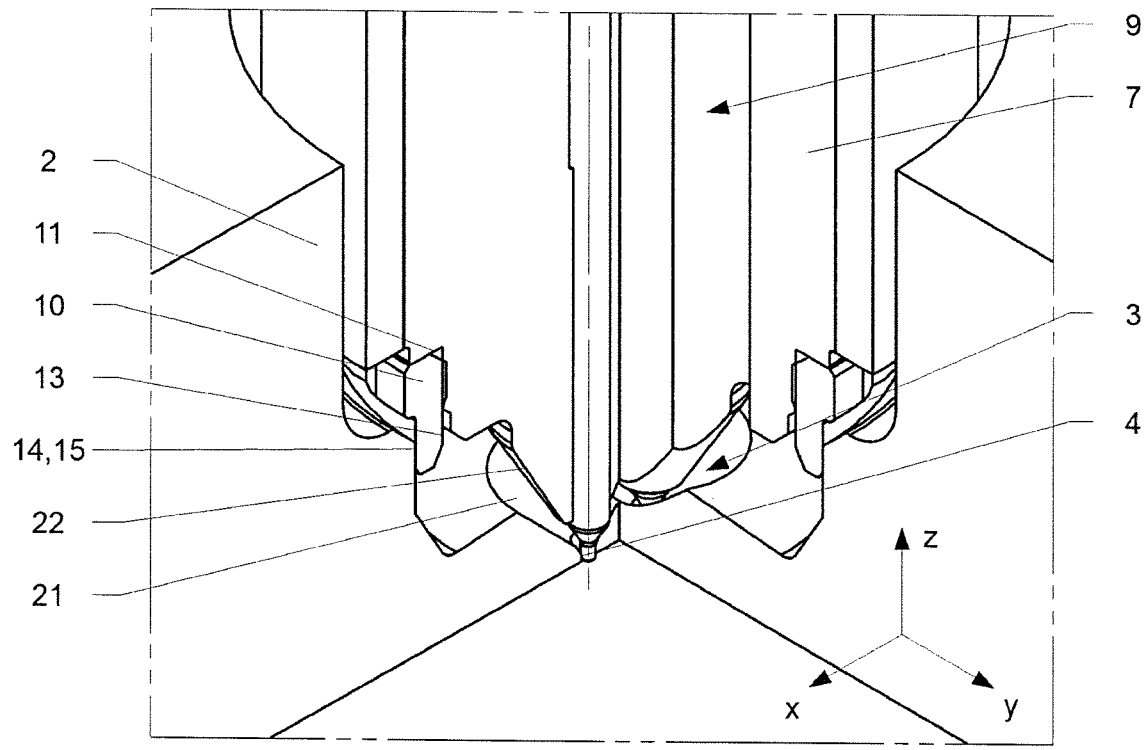
FIG. 8 is a detailed view of FIG. 6 on the pocket.

FIG. 7 and FIG. 8 illustrate a further variation of the injection molding device 1 according to the invention. FIG. 7 shows the injection molding device 1 in a perspective view, partly sectionized. FIG. 8 depicts a detailed view on the pocket 3 of FIG. 7. The variation shown comprises an injection molding device with one nozzle 6 and one mold plate 5. The nozzle 6 comprises two needles 8 which open and close two respective discharge openings 4 that are arranged in line with the needles 8. The mold plate 2 comprises a pocket 3 in which the nozzle 6 is at least partly arranged. Each discharge openings 4 is arranged in a dimple 21. The two dimples 21 are overlapping each other and are thus divided by a ridge 23 between them that is varying in height. The melt channel 9 is located in the housing 7 of the nozzle 6. The opening of the melt channel 9 has the same distance to each opening of the needle bore 18 of the respective needles 8. Therefore, in the axial direction, the openings of the needle bores 18 and the melt channel 9 in the pocket 3 are arranged in a way that they define the corners of a hypothetic triangle. The opening of the melt channel 9 in the pocket 3 may be placed over the ridge 23 in the axial direction (z)—such that the distribution point 24, which is the point under the melt channel 9 opening in axial direction, is placed on the ridge 23. Thus the dimples 21 itself act as stream toughs 25. Alternatively, if the melt channel 9 opens in the pocket 3 but not above a dimple 21 and/or a ridge 23, a distribution point 24 may be used from which multiple stream troughs 25 emerge that guide the melted plastic towards the dimples 21.

The invention claimed is:

1. An injection molding device comprising:
   a. a mold plate with at least one pocket having at least one discharge opening to discharge melted plastic from said pocket into at least one mold cavity interconnected to said pocket and
   b. at least one nozzle comprising a housing, which during operation is interconnected to said pocket, and per discharge opening a needle arranged displaceable in an axial direction (z) in said housing between
      i. a closed position in which the needle closes the thereto related discharge opening thereby preventing melted plastic from flowing from the pocket into the at least one mold cavity, and
      ii. an open position in which the needle releases the discharge opening such that melted plastic flows from the pocket into the at least one mold cavity; and
   c. a melt channel discharging into the pocket to supply melted plastic into the pocket, wherein the melt channel supplies the melted plastic into the pocket independently of the needle arranged in the needle bore.

2. The injection molding device according to claim 1, further comprising: a spacer arranged between the housing of the nozzle and the mold plate and the spacer acts as a thermal isolator and/or a seal between the housing and the mold plate.

3. The injection molding device according to claim 2, wherein the housing comprises a shoulder which supports the spacer in the axial direction (z).

4. The injection molding device according to claim 2, wherein the spacer comprises a sealing lip extending in the axial direction (z) with a first side facing the pocket and a second side, opposite of the first side, abutting against the mold-plate (2) and forming a sealing surface.

5. The injection molding device according to claim 1, wherein the at least one needle is arranged in the housing in a needle bore arranged coaxially with a thereto related discharge opening.

6. The injection molding device according to claim 1, wherein the discharging of the melt channel into the pocket is arranged symmetrically with respect to the at least one discharge opening.

7. The injection molding device according to claim 1, wherein at least one melt channel is arranged at least partially in the housing of the nozzle.

8. The injection molding device according to claim 1, wherein at least two needles are arranged offset to the melt channel.

9. The injection molding device according to claim 8, wherein at least two needles are actuated by a common actuator.

10. The injection molding device according to claim 9, wherein at least two needles are interconnected to the common actuator by an actuator plate.

11. The injection molding device according to claim 1, wherein the pocket comprises per discharge opening a dimple in which the discharge opening is arranged.

12. The injection molding device according to claim 11, wherein the dimple is at least partially shaped conical.

13. The injection molding device according to claim 11, wherein the housing comprises per needle a bump which cooperates with the dimple of the thereto related discharge opening.

14. The injection molding device according to claim 13, wherein the bump is at least partially shaped conical.

15. The injection molding device according to claim 11, wherein two neighboring dimples are spaced apart by a ridge.

16. The injection molding device according to claim 15, wherein the melt channel is arranged aligned with at least one ridge, such that the ridge supports distribution of the melted plastic between at least two discharge openings.

17. The injection molding device according to claim 1, wherein the at least one discharge opening in the area where it interacts with the thereto related needle has a diameter which is 0.02 mm to 0.5 mm larger than the diameter of the thereto related needle.

18. The injection molding device according to claim 1, wherein the at least one needle extends between the housing and the related discharge opening over a free length.

19. The injection molding device according to claim 1, wherein the at least one needle is arranged displaceable in a lateral direction in the needle bore of the housing.

20. The injection molding device according to claim 1, wherein the at least one needle has a needle tip with a reduced diameter foreseen to interact with the discharge opening.

21. The injection molding device according to claim 1, wherein opposite of the melt channel opening to the pocket, a distribution point is located on the mold plate.

22. The injection molding device according to claim 21, wherein a stream trough directs the melt from the distribution point towards the at least one discharge opening in the pocket.

* * * * *